United States Patent [19]
Harrison, Jr.

[11] Patent Number: 5,870,020
[45] Date of Patent: Feb. 9, 1999

[54] VEHICLE ALARM FOR PROVIDING REMOTE INDICATION OF INFILTRATION

[76] Inventor: Henry B. Harrison, Jr., 301 Osprey Dr., Mount Laurel, N.J. 08054

[21] Appl. No.: 862,122

[22] Filed: May 22, 1997

[51] Int. Cl.$^6$ ............................................. B60R 25/10
[52] U.S. Cl. .................. 340/426; 340/825.44; 180/287; 307/10.2; 379/40
[58] Field of Search ........................... 340/426, 429, 340/825.44; 307/10.2; 379/36–51; 180/287

[56] References Cited

U.S. PATENT DOCUMENTS

| | | | |
|---|---|---|---|
| 4,596,985 | 6/1986 | Bongard et al. | 340/825.69 |
| 5,216,407 | 6/1993 | Hwang | 340/426 |
| 5,247,564 | 9/1993 | Zicker | 379/40 |
| 5,559,491 | 9/1996 | Stadler | 340/426 |
| 5,708,417 | 1/1998 | Tallman et al. | 340/426 |

*Primary Examiner*—Jeffery A. Hofsass
*Assistant Examiner*—Sihong Huang

[57] ABSTRACT

A vehicle alarm is provided including a vehicle unit situated within a vehicle. The vehicle unit includes a transmitter for transmitting an activation signal via free space upon the receipt of an alarm signal. An intrusion detection mechanism is adapted to generate an intrusion signal upon the unauthorized infiltration of the vehicle. Another component of the vehicle unit, control means, is adapted to transmit the alarm signal to the transmitter means upon the receipt of the intrusion signal. Next provided is a home unit situated within a house with a dialer for contacting an emergency entity upon the actuation thereof. The home unit further includes a receiver for effecting the actuation of the dialer upon the receipt of the activation signal via free space.

7 Claims, 3 Drawing Sheets

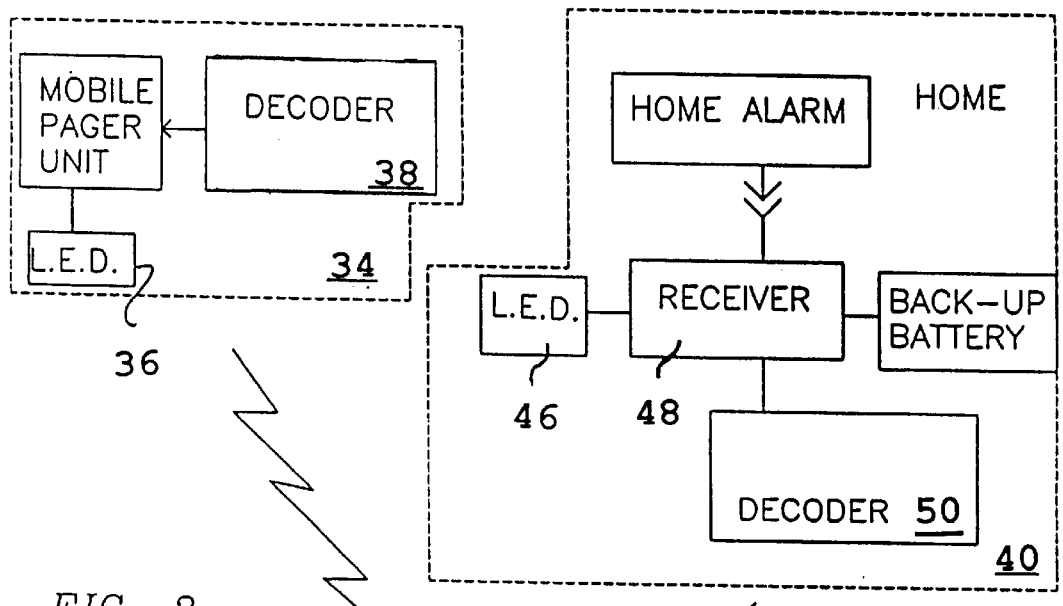
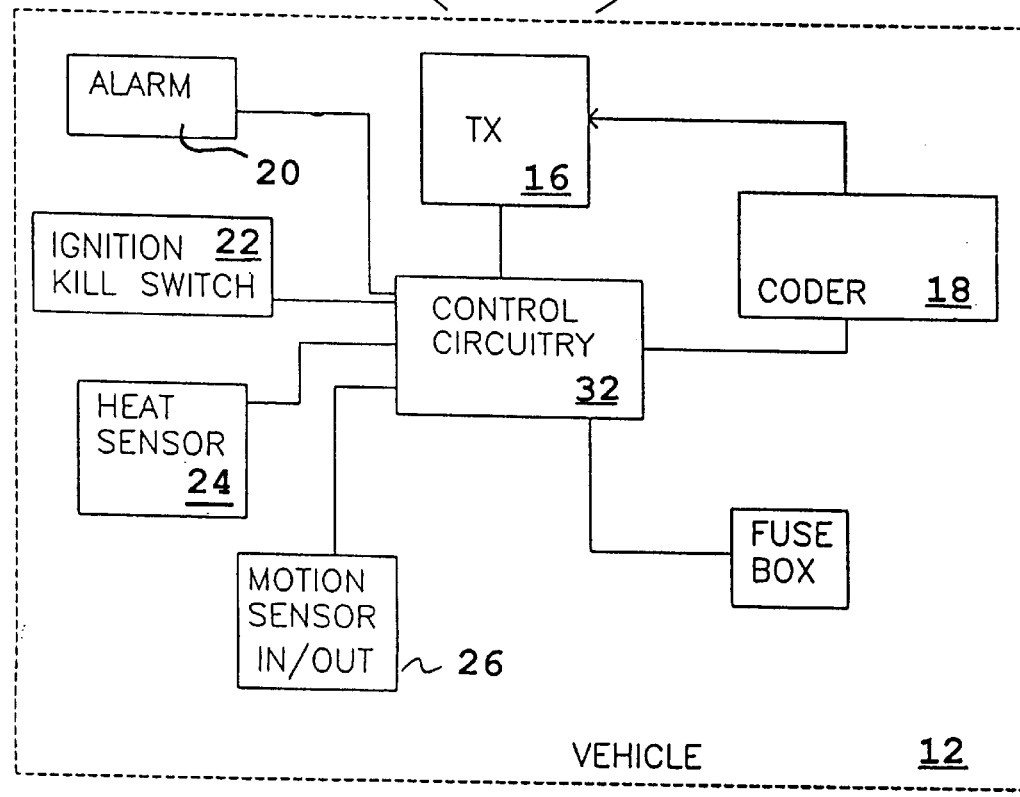
FIG. 2

5,870,020

VEHICLE ALARM FOR PROVIDING REMOTE INDICATION OF INFILTRATION

BACKGROUND OF THE INVENTION

1. Field of the Invention

The present invention relates to a vehicle alarm for providing remote indication of infiltration and more particularly pertains to alerting a user within a home or abroad that a vehicle has been infiltrated or stolen.

2. Description of the Prior Art

The use of car alarms is known in the prior art. More specifically, car alarms heretofore devised and utilized for the purpose of preventing vehicle theft are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,665,379 to Howell et al.; U.S. Pat. No. 5,432,495 to Tompkins; U.S. Pat. No. 5,003,287 to Peters et al.; U.S. Pat. No. 4,978,940 to Kaplan; U.S. Pat. Des. No. 350,494 to Hwang; and U.S. Pat. No. 4,924,206 to Ayers.

In this respect, the vehicle alarm for providing remote indication of infiltration according to the present invention substantially departs from the conventional concepts and designs of the prior art, and in so doing provides an apparatus primarily developed for the purpose of alerting a user within a home or abroad that a vehicle has been infiltrated or stolen.

Therefore, it can be appreciated that there exists a continuing need for a new and improved vehicle alarm for providing remote indication of infiltration which can be used for alerting a user within a home or abroad that a vehicle has been infiltrated or stolen. In this regard, the present invention substantially fulfills this need.

SUMMARY OF THE INVENTION

In view of the foregoing disadvantages inherent in the known types of car alarms now present in the prior art, the present invention provides an improved vehicle alarm for providing remote indication of infiltration. As such, the general purpose of the present invention, which will be described subsequently in greater detail, is to provide a new and improved vehicle alarm for providing remote indication of infiltration which has all the advantages of the prior art and none of the disadvantages.

To attain this, the present invention essentially comprises a vehicle unit situated within a vehicle. Note FIG. 1. The vehicle unit includes a transmitter, as shown in FIG. 2. Such transmitter is designed for transmitting an activation signal via free space upon the receipt of an alarm signal. A coder is connected to the transmitter for the purpose of changing a code which accompanies each activation signal in a predetermined sequence. It is imperative that the change occur upon every separate receipt of the alarm signal. The vehicle unit further includes an audible alarm adapted to emit a high intensity audible alarm within the vehicle upon the receipt of the alarm signal. Associated therewith is an ignition deactivation switch adapted to preclude the activation of the vehicle upon the receipt of the alarm signal. With reference still to FIG. 2, a heat sensor is positioned within the vehicle. The heat sensor is adapted for generating a heat sensed signal upon the detection of a difference in temperature which exceeds a predetermined amount within a predetermined amount of time. A motion sensor is also provided having a first input detector directed toward an interior of the vehicle for generating a primary motion sensed signal upon the detection of movement within the vehicle. Note FIG. 1. A second input detector is directed toward an exterior of the vehicle for generating a secondary motion sensed signal upon the detection of movement on an outside of the vehicle. Connected to the transmitter means, coder means, alarm means, ignition deactivation switch, heat sensor means, and motion sensor means is a control means in the form of control circuitry. Such control means is adapted to transmit the alarm signal to the transmitter means, coder means, alarm means, and ignition deactivation switch upon the receipt of the heat sensed signal. In addition, the control means is further adapted to transmit the alarm signal to the transmitter means, coder means, alarm means, and ignition deactivation switch upon the receipt of the secondary motion sensed signal and subsequent receipt of the primary motion sensed signal. Next provided is a mobile pager adapted to be worn on an article of clothing of a user. The pager has an alerting means positioned thereon for alerting the user upon the receipt of the activation signal in addition to the successful verification of the code accompanying the activation signal with a stored correct code. To accomplish this, the pager further has a decoder for effecting successful verification of the code accompanying the activation signal only when said code matches the stored correct code. To ensure that the stored code corresponds with the code which is transmitted by the transmitter, the stored correct code is changed by the decoder means of the mobile pager in said predetermined sequence upon each separate receipt of the activation signal via free space. Finally, a home unit is situated within a house of the user. The home unit includes a dialer for contacting an emergency entity via a telecommunication network upon the actuation thereof. Further included is an audible alarm for emitting a high intensity audible alarm when actuated. Associated therewith is a visual alarm for providing a visual alert upon the actuation thereof. As shown in FIG. 3, the home unit further includes a receiver connected to the dialer means, audible alarm means, and visual alarm for effecting the actuation thereof upon the receipt of the activation signal via free space in addition to the successful verification of the code accompanying the activation signal. Such successful verification is made with a stored correct code. A decoder is connected to the receiver for allowing the successful verification of the code accompanying the activation signal only when said code matches the stored correct code. For reasons similar to those set forth in the description of the mobile pager, the stored correct code is changed by the decoder of the home unit in said predetermined sequence upon each receipt of the activation signal via free space.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle alarm for providing remote indication of infiltration which has all the advantages of the prior art car alarms and none of the disadvantages.

It is another object of the present invention to provide a new and improved vehicle alarm for providing remote indication of infiltration which may be easily and efficiently manufactured and marketed.

It is a further object of the present invention to provide a new and improved vehicle alarm for providing remote indication of infiltration which is of a durable and reliable construction.

An even further object of the present invention is to provide a new and improved vehicle alarm for providing remote indication of infiltration which is susceptible of a low cost of manufacture with regard to both materials and labor, and which accordingly is then susceptible of low prices of sale to the consuming public, thereby making such vehicle alarm for providing remote indication of infiltration economically available to the buying public.

Still yet another object of the present invention is to provide a new and improved vehicle alarm for providing remote indication of infiltration which provides in the apparatuses and methods of the prior art some of the advantages thereof, while simultaneously overcoming some of the disadvantages normally associated therewith.

Still another object of the present invention is to alert a user within a home or abroad that a vehicle has been infiltrated or stolen.

Lastly, it is an object of the present invention to provide a new and improved vehicle alarm is provided including a vehicle unit situated within a vehicle. The vehicle unit includes a transmitter for transmitting an activation signal via free space upon the receipt of an alarm signal. An intrusion detection mechanism is adapted to generate an intrusion signal upon the unauthorized infiltration of the vehicle. Another component of the vehicle unit, control means, is adapted to transmit the alarm signal to the transmitter means upon the receipt of the intrusion signal. Next provided is a home unit situated within a house a with a dialer for contacting an emergency entity upon the actuation thereof. The home unit further includes a receiver for effecting the actuation of the dialer upon the receipt of the activation signal via free space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic diagram of the vehicle unit, the mobile pager unit and a first embodiment of the home unit.

Similar reference characters refer to similar parts throughout the several views of the drawings.

DESCRIPTION OF THE PREFERRED EMBODIMENT

Figure 1:
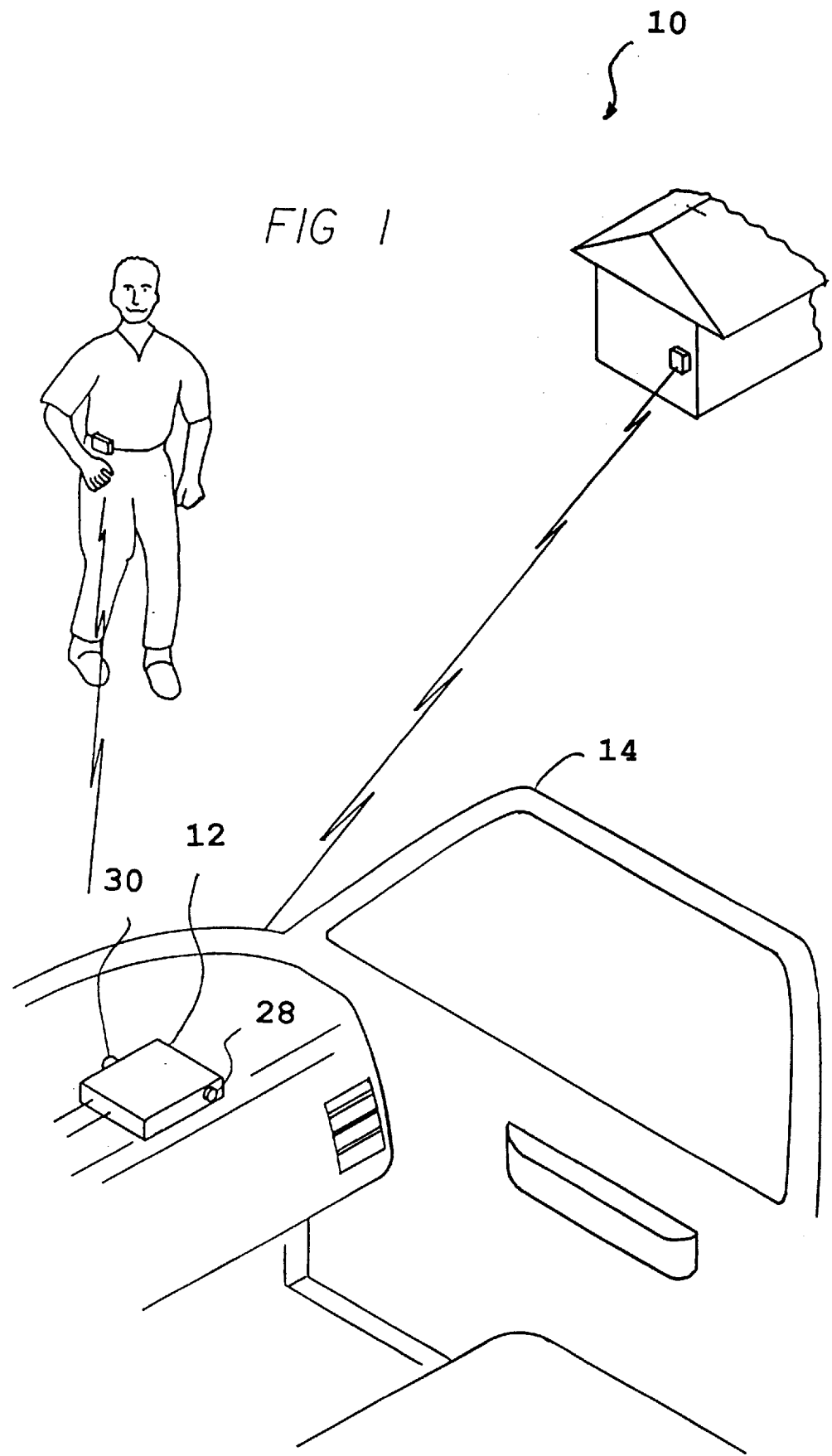
FIG. 1 is a perspective illustration of the preferred embodiment of the vehicle alarm for providing remote indication of infiltration constructed in accordance with the principles of the present invention.

With reference now to the drawings, and in particular to FIG. 1 thereof, a new and improved vehicle alarm for providing remote indication of infiltration embodying the principles and concepts of the present invention and generally designated by the reference numeral 10 will be described.

The present invention, the new and improved vehicle alarm for providing remote indication of infiltration, is comprised of a plurality of components. Such components in their broadest context include a vehicle unit, mobile page unit, and a home unit. Such components are individually configured and correlated with respect to each other so as to attain the desired objective.

More specifically, it will be noted that the system 10 of the present invention includes a vehicle unit 12 situated within a vehicle 14. Note FIG. 1. The vehicle unit includes a transmitter 16, as shown in FIG. 2. Such transmitter is designed for transmitting an activation signal via free space upon the receipt of an alarm signal. A coder 18 is connected to the transmitter for the purpose of changing a code which accompanies each activation signal in a predetermined sequence. Such sequence is dictated by a unique algorithm. It is imperative that the change occur upon every separate receipt of the alarm signal. In other words, the code which accompanies each transmission of the activation signal changes for each separate actuation of the present alarm. The vehicle unit further includes an audible alarm 20 which is also situated within the housing. The alarm is adapted to emit a high intensity audible alarm in the proximity of the vehicle upon the receipt of the alarm signal. Associated therewith is an ignition deactivation switch 22 adapted to preclude the activation of the vehicle upon the receipt of the alarm signal. To accomplish such, the ignition deactivation switch is connected between the ignition switch and the battery of the vehicle.

With reference still to FIG. 2, a heat sensor 24 is positioned within the vehicle. The heat sensor is adapted for generating a heat sensed signal upon the detection of a difference in temperature which exceeds a predetermined amount. For such sensor to work effectively, it is important that such change in temperature is detected within a predetermined amount of time. A motion sensor 26 is also provided having a first input detector 28 directed toward an interior of the vehicle for generating a primary motion sensed signal upon the detection of movement within the vehicle. Note FIG. 1. A second input detector 30 is directed toward an exterior of the vehicle for generating a secondary motion sensed signal upon the detection of movement on an outside of the vehicle. In an alternate embodiment, a plurality of second input detectors may be utilized to better monitor the exterior of vehicle.

Connected to the transmitter means, coder means, alarm means, ignition deactivation switch, heat sensor means, and motion sensor means is a control means 32 in the form of control circuitry. Such control means is adapted to transmit the alarm signal to the transmitter means, coder means, alarm means, and ignition deactivation switch upon the receipt of the heat sensed signal. In addition, the control means is further adapted to transmit the alarm signal to the transmitter means, coder means, alarm means, and ignition deactivation switch upon the receipt of the secondary motion sensed signal and subsequent receipt of the primary motion sensed signal. For powering the vehicle unit, the control means is preferably connected to the fuse box. For providing a back up source of power, a battery is connected to the vehicle unit and all the remaining components of the present invention. It should be noted that all of the components of the vehicle unit are contained within a housing with the exception of the transmitter which is positioned within a discrete area. To prevent inadvertent deactivation of the transmitter, it is adapted to be shut off only upon the depression of an unillustrated reset switch located thereon.

Next provided is a mobile pager 34 adapted to be worn on an article of clothing of a user. The pager has an alerting means 36 positioned thereon for alerting the user upon the receipt of the activation signal via free space in addition to the successful verification of the code accompanying the activation signal with a stored correct code. To accomplish this, the pager further has a decoder 38 for effecting successful verification of the code accompanying the activation signal only when said code matches the stored correct code. To ensure that the stored code corresponds with the code which is transmitted by the transmitter, the stored correct code is changed by the decoder means of the mobile pager in said predetermined sequence upon each separate receipt of the activation signal via free space. It should be understood that the mobile pager is similar in design to a conventional pager in that the alerting means includes a vibration mechanism and audible alarm. In addition, the alerting means of the mobile pager unit further includes a light emitting diode.

Figure 3:
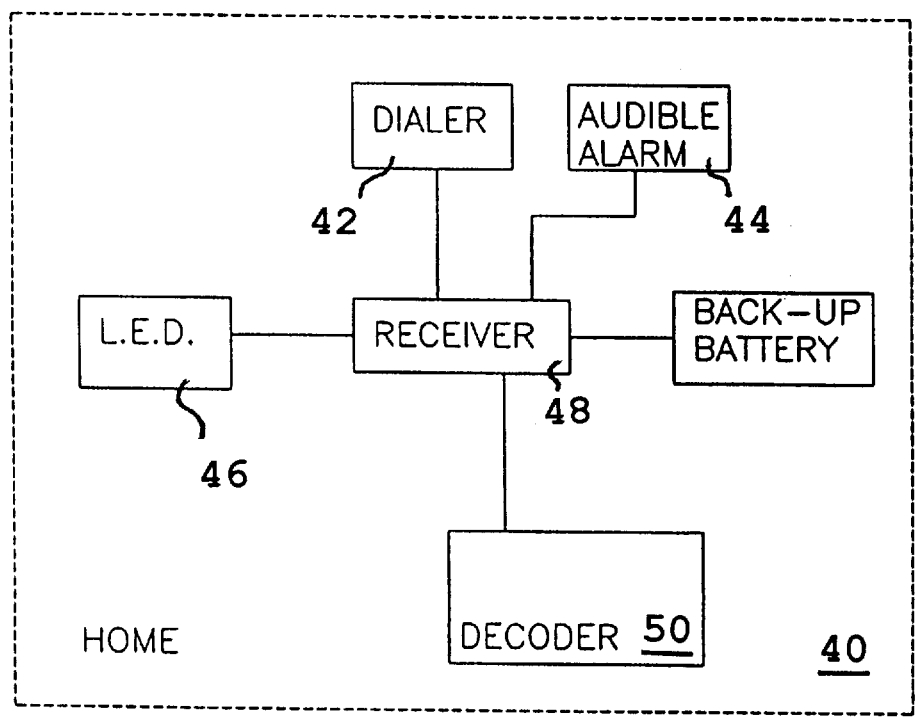
FIG. 3 is a schematic diagram of the vehicle unit, the mobile pager unit and another embodiment of the home unit.

Finally, a home unit 40 is situated within a house of the user. The home unit includes a dialer 42 for contacting an emergency entity via a telecommunication network upon the actuation thereof. Further included is an audible alarm 44 for emitting a high intensity audible alarm when actuated. Associated therewith is a visual alarm 46 for providing a visual alert upon the actuation thereof. As shown in FIG. 3, the home unit further includes a receiver 48 connected to the dialer means, audible alarm means, and visual alarm for effecting the actuation thereof upon the receipt of the activation signal via free space in addition to the successful verification of the code accompanying the activation signal. Such successful verification is made with a stored correct code. A decoder 50 is connected to the receiver for allowing the successful verification of the code accompanying the activation signal only when said code matches the stored correct code. For reasons similar to those set forth in the description of the mobile pager, the stored correct code is changed by the decoder of the home unit in said predetermined sequence upon each receipt of the activation signal via free space. If the code of the various units of the present invention become out of sync, a power down of the mobile pager unit and home unit and further the depression of the reset switch of the transmitter of the vehicle unit may be utilized to reset the predetermined code sequencing and afford proper operation. It should be understood that the code sequencing of the present invention precludes evading by a perpetrator.

In another embodiment, the receiver of the home unit is connected directly to a conventional existing home alarm which may have plural alerting mechanisms. In such embodiment, the receiver basically acts as a switch to activate the home alarm upon the receipt of the activation signal.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved vehicle alarm for providing remote indication of infiltration comprising, in combination:

a vehicle unit situated within a vehicle, the vehicle unit including transmitter means for transmitting an activation signal via free space upon the receipt of an alarm signal, coder means connected to the transmitter means for changing a code which accompanies each activation signal in a predetermined sequence, wherein the change occurs upon every separate receipt of the alarm signal, the vehicle unit further including audible alarm means adapted to emit a high intensity audible alarm within the vehicle upon the receipt of the alarm signal, an ignition deactivation switch adapted to preclude the activation of the vehicle upon the receipt of the alarm signal, a heat sensor means positioned within the vehicle for generating a heat sensed signal upon the detection of a difference in temperature which exceeds a predetermined amount within a predetermined amount of time, a motion sensor having a first input detector directed toward an interior of the vehicle for generating a primary motion sensed signal upon the detection of movement within the vehicle and a second input detector directed toward an exterior of the vehicle for generating a secondary motion sensed signal upon the detection of movement on an outside of the vehicle, and control means connected to the transmitter means, coder means, alarm means, ignition deactivation switch, heat sensor means, and motion sensor means, the control means adapted to transmit the alarm signal to the transmitter means, coder means, alarm means, and ignition deactivation switch upon the receipt of the heat sensed signal, the control means further adapted to transmit the alarm signal to the transmitter means, coder means, alarm means, and ignition deactivation switch upon the receipt of the secondary motion sensed signal and subsequent receipt of the primary motion sensed signal;

mobile pager means adapted to be worn on an article of clothing of a user, the pager means having an alerting means positioned thereon for alerting the user upon the receipt of the activation signal by the pager means via free space in addition to the successful verification of the code accompanying the activation signal with a stored correct code, the pager means further having a decoder means for effecting successful verification of the code accompanying the activation signal only when said code matches the stored correct code, wherein the stored correct code is changed by the decoder means of the mobile pager means in said predetermined sequence upon each separate receipt of the activation signal via free space; and a home unit situated within a house, the home unit including a dialer means for contacting an emergency entity via a telecommunication network upon the actuation thereof, an audible alarm means for emitting a high intensity audible alarm when actuated, and a visual alarm means for providing a visual alert upon the actuation thereof, the home unit further including receiver means connected to the dialer means, audible alarm means, and visual alarm means for effecting the actuation thereof upon the receipt of the activation signal via free space in addition to the successful verification of the code accompanying the activation signal with the stored correct code, the home unit further having a decoder means connected to the receiver means for allowing the successful verification of the code accompanying the activation signal only when said code matches the stored correct code, wherein the stored correct code is changed by the decoder means of the home unit in said predetermined sequence upon each receipt of the activation signal via free space.

2. A vehicle alarm for providing remote indication of infiltration comprising:

a vehicle unit situated within a vehicle, the vehicle unit including transmitter means for transmitting an activation signal via free space upon the receipt of an alarm signal, intrusion detection means adapted to generate an intrusion signal upon the unauthorized infiltration of the vehicle, and control means adapted to transmit the alarm signal to the transmitter means upon the receipt of the intrusion signal; and a home unit situated within a house, the home unit including dialer means for contacting an emergency entity upon the actuation thereof, the home unit further including a receiver means for effecting the actuation of the dialer means upon the receipt of the activation signal via free space;

wherein the intruder detection means includes a heat sensor means positioned within the vehicle and connected to the control means for generating the intrusion signal upon the detection of a difference in temperature which exceeds a predetermined amount within a predetermined amount of time;

wherein the intruder detection means further includes a motion sensor positioned within the vehicle and connected to the control means, the motion sensor means having a first input detector directed toward an interior of the vehicle for generating a primary motion sensed signal upon the detection of movement within the vehicle and a second input detector directed toward an exterior of the vehicle for generating a secondary motion sensed signal upon the detection of movement on an outside of the vehicle, whereby the control means is adapted to transmit the alarm signal to the transmitter means upon the receipt of the secondary motion sensed signal and subsequent receipt of the primary motion sensed signal.

3. A vehicle alarm for providing remote indication of infiltration as set forth in claim 2 wherein the vehicle unit includes coder means connected to the control means and transmitter means for changing a code which accompanies each activation signal in a predetermined arrangement, wherein the change occurs upon every separate receipt of the alarm signal, whereby the receiver means only actuates the dialer means upon the successful verification of the code accompanying the activation signal with a stored correct code, the home unit further having a decoder means connected to the receiver means for allowing the successful verification of the code accompanying the activation signal only when said code matches the stored correct code, wherein the stored correct code is changed by the decoder means in said predetermined sequence upon each separate receipt of the activation signal via free space.

4. A vehicle alarm for providing remote indication of infiltration as set forth in claim 2 and further including a mobile pager means adapted to be worn on an article of clothing of a user, the pager means having an alerting means positioned thereon for alerting the user upon the receipt of the activation signal by the pager means via free space.

5. A vehicle alarm for providing remote indication of infiltration as set forth in claim 4 wherein the alerting means is adapted to alert the user only upon the successful verification of the code accompanying the activation signal with a stored correct code, wherein the pager means further has a decoder means for effecting successful verification of the code accompanying the activation signal only when said code matches the stored correct code, wherein the stored correct code is changed by the decoder means of the mobile pager means in said predetermined sequence upon each separate receipt of the activation signal via free space.

6. A vehicle alarm for providing remote indication of infiltration as set forth in claim 2 wherein the vehicle unit further includes audible alarm means connected to the control means and adapted to emit a high intensity audible alarm within the vehicle upon the receipt of the alarm signal.

7. A vehicle alarm for providing remote indication of infiltration as set forth in claim 2 wherein the vehicle unit further includes an ignition deactivation switch connected to the control means and adapted to preclude the activation of the vehicle upon the receipt of the alarm signal.

* * * * *